(12) United States Patent
Korpela et al.

(10) Patent No.: US 10,294,130 B2
(45) Date of Patent: May 21, 2019

(54) CONSTRUCTION OF DEVICES FOR PURIFICATION AND DISINFECTION OF WASTE WATER WITH ELECTRICAL CURRENT

(71) Applicants: Timo Korpela, Turku (FI); Choong-Kyang Kang, Paju (KR); Alexander Lashkul, Turku (FI)

(72) Inventors: Timo Korpela, Turku (FI); Choong-Kyang Kang, Paju (KR); Alexander Lashkul, Turku (FI)

(73) Assignee: OY Elflot Ltd, Turku (FI)

( * ) Notice: Subject to any disclaimer, the term of this patent is extended or adjusted under 35 U.S.C. 154(b) by 0 days.

(21) Appl. No.: 15/771,530

(22) PCT Filed: Oct. 19, 2016

(86) PCT No.: PCT/FI2016/050735
§ 371 (c)(1),
(2) Date: Apr. 27, 2018

(87) PCT Pub. No.: WO2017/072403
PCT Pub. Date: May 4, 2017

(65) Prior Publication Data
US 2018/0354818 A1 Dec. 13, 2018

(30) Foreign Application Priority Data
Oct. 27, 2015 (FI) .................................... 20150300

(51) Int. Cl.
*C02F 1/465* (2006.01)
*C02F 1/00* (2006.01)
(Continued)

(52) U.S. Cl.
CPC .............. *C02F 1/465* (2013.01); *C02F 1/008* (2013.01); *C02F 1/467* (2013.01);
(Continued)

(58) Field of Classification Search
CPC ...................................................... C02F 1/465
See application file for complete search history.

(56) References Cited

U.S. PATENT DOCUMENTS 3,975,247 A 8/1976 Stralser
7,914,662 B2 3/2011 Robinson
(Continued)

FOREIGN PATENT DOCUMENTS

CN 1075699 A 9/1993
WO 03062152 A1 7/2003
(Continued)

OTHER PUBLICATIONS

Yahiaoui O. et al. Evaluating removai of metribuzin pesticide from contaminated groundwater using an electrochemical reactor combined with ultraviolet oxidation. Desalination, 2011, vol. 270, No. 1-3, pp. 84-89 Chapters 2.2 and 24; Figure 1.
(Continued)

*Primary Examiner* — Peter Keyworth
(74) *Attorney, Agent, or Firm* — Berggren LLP

(57) ABSTRACT

The invention provides a device to purify waste water by a two-step procedure containing an electroflotation unit and an electrical disinfection unit integrated into the same overall construction. Characteristic to the construction is that the said two units have a common anode and two individual cathodes which can be in different potentials in respect to the common anode.

16 Claims, 4 Drawing Sheets

(51) Int. Cl.
*C02F 1/461* (2006.01)
*C02F 1/467* (2006.01)
(52) U.S. Cl.
CPC ............ *C02F 1/46109* (2013.01); *C02F 2001/46119* (2013.01); *C02F 2001/46138* (2013.01); *C02F 2001/46171* (2013.01); *C02F 2201/003* (2013.01); *C02F 2201/4611* (2013.01); *C02F 2201/4613* (2013.01); *C02F 2201/4614* (2013.01); *C02F 2201/4617* (2013.01); *C02F 2201/46145* (2013.01); *C02F 2209/001* (2013.01); *C02F 2209/02* (2013.01); *C02F 2209/03* (2013.01); *C02F 2209/05* (2013.01); *C02F 2209/11* (2013.01); *C02F 2301/024* (2013.01); *C02F 2303/02* (2013.01); *C02F 2303/04* (2013.01); *C02F 2303/08* (2013.01)

(56) References Cited

U.S. PATENT DOCUMENTS

| | | |
|---|---|---|
| 2004/0031761 A1 | 2/2004 | Wunsche et al. |
| 2005/0183964 A1 | 8/2005 | Roberts et al. |
| 2012/0160706 A1* | 6/2012 | Poirier .............. C02F 1/463 205/756 |
| 2012/0186992 A1 | 7/2012 | Berrak |
| 2014/0027271 A1 | 1/2014 | Berrak et al. |

FOREIGN PATENT DOCUMENTS

| | | |
|---|---|---|
| WO | 2011000079 A1 | 1/2011 |
| WO | 2012088867 A1 | 7/2012 |
| WO | 2012170774 A1 | 12/2012 |

OTHER PUBLICATIONS

Office Action dated May 26, 2016 in the FI priority application No. 20150300.

Schmalz, Viktor, Electrochemical disinfection of biologically treated wastewater from small treatment systems by using boron-doped diamond (BDD) electrodes—Contribution for direct reuse of domestic wastewater, Water Research, 2009, pp. 5260-5266, vol. 40, Elsevier.

Anglada, Ángela et al., Contributions of electrochemical oxidation to waste-water treatment: fundamentals and review of applications, Journal of Chemical Technology and Biotechnology, Dec. 2009, pp. 1747-1755, vol. 84 issue 12, John Wiley & Sons.

* cited by examiner

CONSTRUCTION OF DEVICES FOR PURIFICATION AND DISINFECTION OF WASTE WATER WITH ELECTRICAL CURRENT

PRIORITY

This application is a U.S. national application of the international application number PCT/FI2016/050735 filed on Oct. 19, 2016 and claiming priority of Finnish national application FI20150300 filed on Oct. 27, 2015, the contents of all of which are incorporated herein by reference.

FIELD OF INVENTION

The invention deals with processes for purification of contaminated water. More specifically, the present invention describes improved constructions of devices which exploit electricity to achieve reusable water from waste waters. The invention combines various effects of electrolysis to flocculate and remove colloidal and other particles followed by disinfection of the microbial residues.

BACKGROUND OF THE INVENTION

Human mankind is encountered with increasing problems of municipal and industrial waste waters which must be purified and reused. Physical, chemical, and biological purification processes have been developed.

Electroflotation and electroflocculation are established and rather commonly used purification methods especially for industrial waste waters. Direct current is applied to achieve decomposition of water to produce hydrogen, oxygen and other gases depending on the inorganic content of water. Electricity causes various secondary reactions in the solutions which affect the solubility of colloidal particles to decrease. They form flocks which are bound to gas bubbles and lifted by the buoyance forces to the surface to form relatively stable flocks (froth) which is then collected. The present state of the art is described, for example, in the publication by Anglada et al. (2009), J. Chem. Technol. Biotechnol. 84:1747-1755.

Purification and microbial disinfection of waste waters are interconnected tasks. Removal of organic load from waste water usually removes also microbes. The allowed amount of microbes or viruses in purified discharge water is very low and water purification enough carefully to attain the microbial purity is rarely economical. Therefore, microbial residues may need to be disinfected.

When the treated water is released to the natural water circulation, it almost always still contains microbes, particles, and chemicals interfering with the natural habitats. The risk of infections by micro-organisms such as bacteria, viruses, fungi, protozoa, prions, and algae is still high. They may have survived through the purification process or even been propagated in the process itself. Pathogens may cause aberrations in the ecosystems although they will not directly infect humans. The possible harmful effects largely depend on the climatic and soil/drainage basin conditions of the waste discharge environment. However, even occasional infections may be harmful and it needs to secure that the discharge liquids are microbiologically safe by applying disinfection.

The disinfection of contaminated waters can be divided into chemical and physical techniques. The chemical ones include treatment with active chlorine compounds. Ozone is popular in disinfection of drinking water. Various methods to produce ozone and chlorine gas or compounds which release them are in use. Chemical methods have the drawback of yielding residues of unnatural chemicals and their reaction products, in addition to the high costs and difficulties in controlled dosing.

Many disinfection methods deploy ultraviolet (UV) radiation to kill microbes. A drawback is its low effectivity and high selectivity to only certain organisms, and the poor penetration of the UV radiation in water, especially in turbid solutions. A further problem is the fouling of the radiation surfaces that demands their constant cleaning. High voltage electric pulses of kV range kill microbes by causing small pores in cell membranes that allows cell contents to leak out. It is evident that different microbes have largely different sensitivities to the electricity. Applying of the high voltages is limited to spaces closed from the public.

Low-voltage direct current has been deployed for disinfection of waste waters in various formats. The most popular is in situ production of oxidative chlorine compounds from concentrated NaCl solutions exemplified by publication WO 2012 170774 A1 (Lumetta M.). The chlorine gases from anode are introduced to water to be disinfected. The gases contain also other disinfecting compounds like reactive oxygen, ozone, alkali and acids. The electrodes may include semipermeable membranes or porous filters so that gases at anode and cathode do not mix as exemplified by publication by Baichen W., CN1075699A. In situ production of disinfection gases has the advantage of production of poisonous chemicals without need of their storage and transport. The main disadvantage of the in situ processes is the use of semipermeable membranes which tend to clog and must be regularly cleaned and/or changed.

The electrochemical cathode reactions produce basic hydroxyl ions and molecular hydrogen. The hydrogen is generated about 0.4 liter (NTP) per Ah. The hydrogen formation is less useful for the disinfection while it is important for obtaining the flotation effect. US 2004/0031761 (M. Blaschke et al.) describes a device without cathodic hydrogen evolution. In proper conditions the reduction power at cathode can be transformed to hydrogen peroxide formation which may be used as a disinfectant. The method is, however, too complex for wider use.

The electric disinfection systems have been tested in various electrolysis chambers including additional walls or not. A classification of different prior art cells is described in FIG. 3 by Angala, A. et al. (2009) J. Chem. Technol. Biotechnol. 84:1747-1755.

Anodic corrosion is a serious problem in electroflotation, as well as, in the disinfection systems. It can be diminished by specific coatings of the electrodes, like boron-doped diamond on titanium or stainless steel as described by V. Schmalz in Water Research 43:2009, pp. 5260-5266. Such anode coatings have been considered to provide higher organic oxidation rates and greater current efficiencies than other commonly used metal oxides like $PbO_2$ and $Ti/SnO_2$—$Sb_2 O_5$. High current density increases the generation of electrochemical oxidants. The specific coatings of the electrodes provide relatively limited benefits considering the increased costs of the electrodes. Titan anode was coated with nanocatalytic $TiO_2$ of 10-35 nm thickness by S. Zhang (WO2012088867 A1). Because of the stability of the grainy nano-coating is dependent on the polarity of the electrode, the polarity cannot obviously be changed to prevent the clogging of electrodes which makes a drawback in the said invention. Clogging is a general serious drawback in the use of such coatings.

Electrode corrosion is also exploited in waste water purification. When corroding (synonyms: reactive, dissolving, consumable, sacrificed etc.) electrodes are exploited in a flotation device construction, the purpose is to produce coagulating metal ions (e.g. of Fe, Al, Mg). This has advantage of unnecessity to add them whereas a very serious drawback is that the control of the process is lost since the amount of metal dissolution and the relative gas evolution cannot be optimized. Limitations to change polarity are also met. Reactive electrodes have been, however, described with different constructions in the context of flotation devices exemplified by U.S. Pat. No. 7,914,662 B" (2011) by Robinson, V. N. E. The publication describes Al or Fe reactive anodes with inert cathode. US 2012/0186992 (Barrack, A.) describes corroding electrodes which additionally contain strong agitation of the fluid to force flocculating materials to meet. U.S. Pat. No. 3,975,247 (Stralser, B. J., 1976) exploits multiple of electrodes which are not electrically connected to a DC power supply except the outer and inner electrodes. The essential physical effect of the inner metal plates is to act as barriers to force waste water to flow up to down and cause mixing which may aid in electroflocculation.

Especially serious hindrance for adoption of electric technologies in waste water purification is the technical realization of convenient and long-life maintenance-free equipment. The primary problems arise from electrode corrosion and electrode passivation by deposition of materials on the electrodes. When considering the overall economy, usual low-corrosion anode materials, like titanium and stainless steel may be optimal if the corroded electrodes can be easily serviced, i.e. changed and/or cleaned.

The present invention exploits the low voltage electricity techniques but avoids the above-described drawbacks by using a novel integrated construction for flotation and disinfection device. The buoyance force of electro-generated gas bubbles are arranged to take an optimal role in liquid flow to up and down while the construction remains simple and allows an easy service and easy removal of the corroding parts.

DETAILED DESCRIPTION OF THE INVENTION

Figure 2:
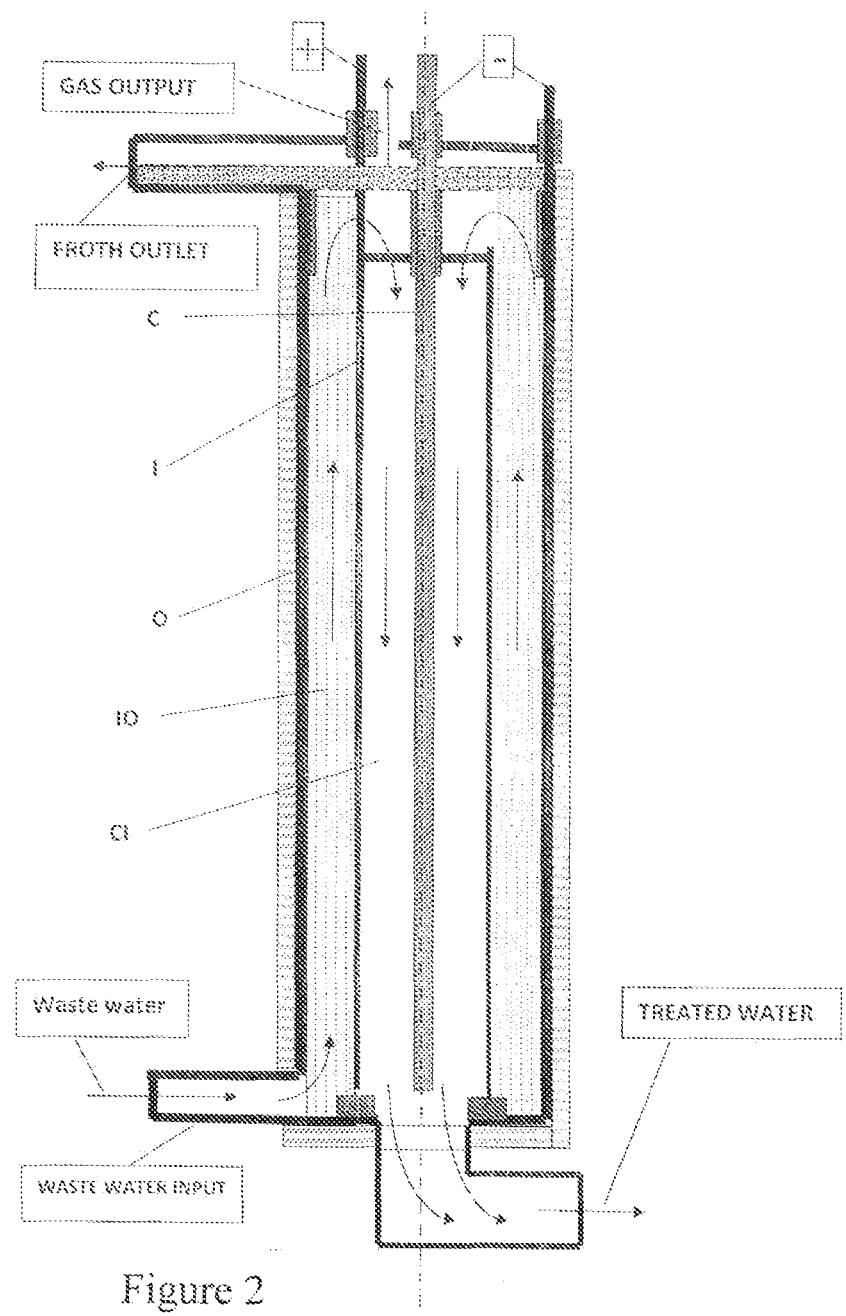
FIG. 2 illustrates a variant of construction show in FIG. 1. The waste water is introduced into space between O-I and purified water is introduced into inner tube and goes out from the bottom of the inner tube. The symbols have similar meaning as in FIG. 1. The drainage output (treated water) is taken off passively on the level of froth outlet (through a tube indicated by name "treated water"). The two tubes I and O are surrounded with a plastic container (symbol like in FIG. 3).
Figure 3:
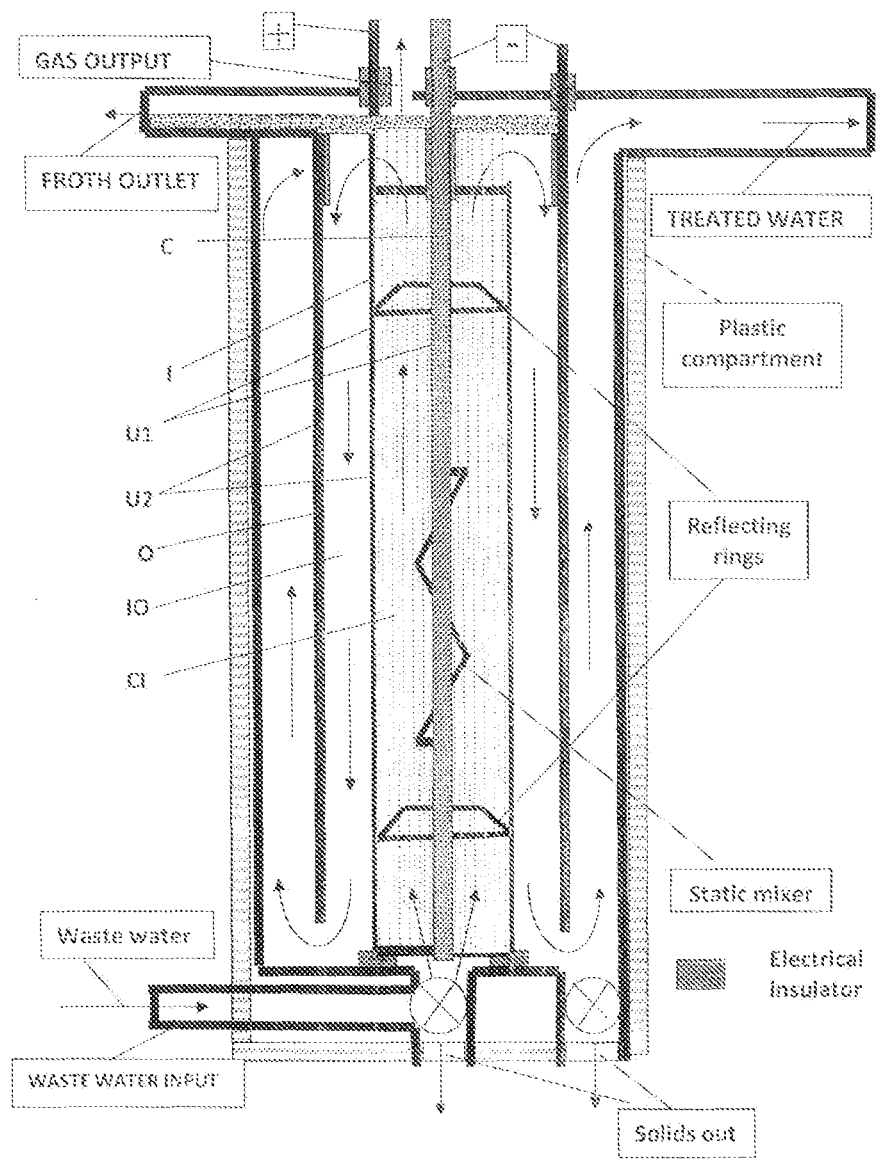
FIG. 3. illustrates another variant of the construction of the present invention. Tubes I and O are surrounded with additional tube. In this model sterilized waste water is taken out through the down end I on the whole bottom area and lifted up all around tube O and finally the treated water comes out from the top. This construction has the advantage of liquid's longer retaining in the sterilization conditions, more constant flow speed around the tube I, and having a more compact construction. The distance between the tubes are not necessarily as drawn.
Figure 4:
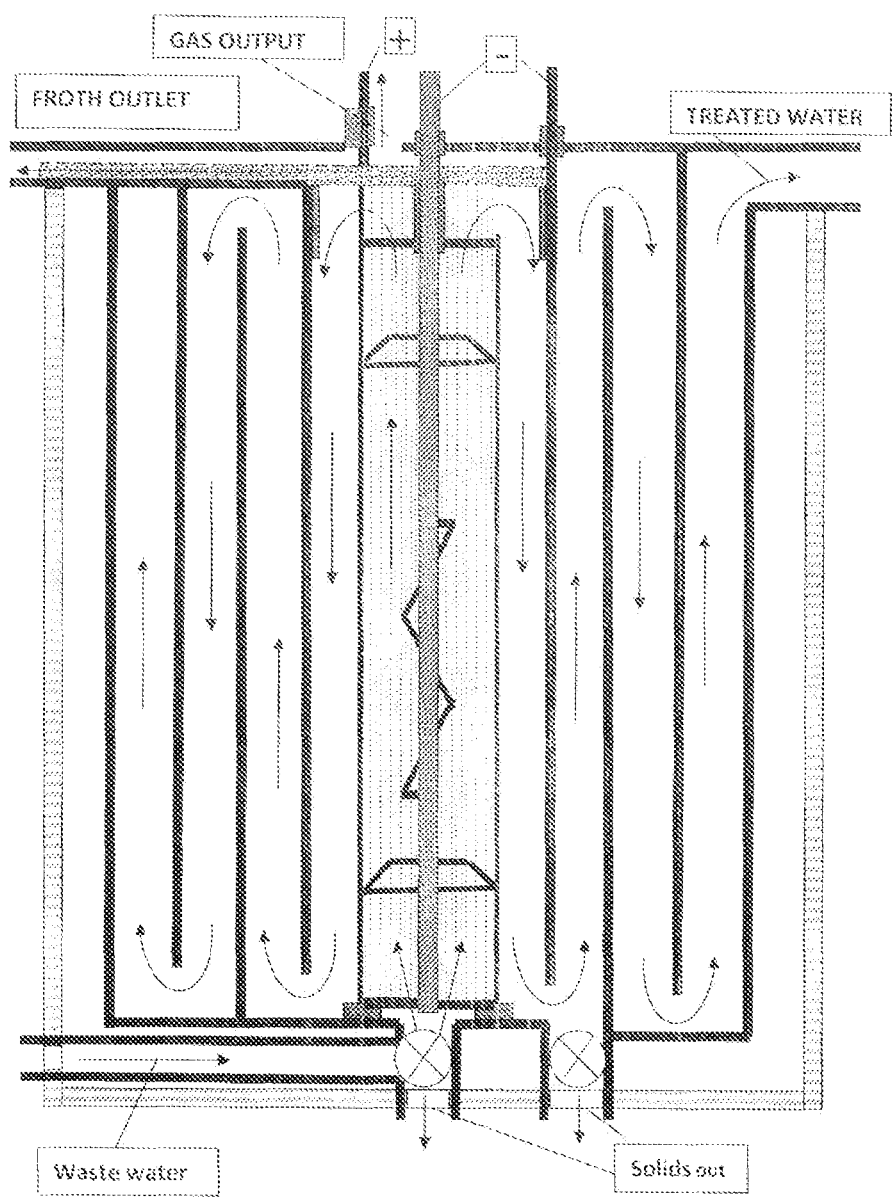
FIG. 4. describes a variant of construction when the liquid flow system is optimized for special purposes by one additional stay for disinfection. With this construction sterilization time can be further extended.

The present invention describes a simple compact construction for a 2-step electrical purification and disinfection equipment to be applied to waste waters originating from industrial and/or communal sources. The simplest construction is described in FIG. 1. It involves two operationally connected main chambers, the chamber for removal of solids (flotation and flocculation chamber) and chamber for sterilizing or disinfection the purified water. The third part is auxiliary for removal of generated solids (froth) and exhaust gases. The construction includes two Ohmically isolated metal tubes of different diameters inside each others. The tubes are in electrolytic contact through the waste water. The first step (flotation) of the treatment process comprises disruption of colloidal systems to achieve flock and removal of floated material. In the second step the purified waste water is subjected to treatment by strong disinfection compounds which are generated electrolytically from the waste water. FIGS. 2, 3, and 4 describe variants of the same principles which can be arranged to meet different needs. The variants can be also crossed by various ways so that waste water can come in to different chambers. Whereas the present invention exploits the general principles of known techniques of electroflotation and electroflocculation, as well as disinfection by electrolysis, technically the construction of the device is arranged more advantageously than in the prior art and is therefore more effective. The benefits of the present invention are smaller size, better purification and sterilization results, due to increased concentration of the sterilization gases in the second step (chamber 2) and easier service. These advantages also bring about an improved economy over the prior art.

The application areas of the present invention are wide from food, agro industry and to urban waste waters.

Definitions

Waste water is used herein broadly for waters which shall be purified further for improving the water quality in regard of organic and non-organic contaminants. The term waste water is used including, but not limited to, surface water, groundwater, industrial process water, sanitary sewage, industrial waste water, water containing chemicals, conventional water treatment, activated sludge treatment, and waters from domestic and communal plants. It is assumed that the waste water is free from strongly sedimenting solids and has a low viscosity which allows applying of the flotation techniques.

Flotation means herein removal of solids or colloids from contaminated water by using gas bubbles generated with the aid of electrolysis to lift flocks generated in the liquid or achieved by addition of flocculating chemicals to the water surface.

Electrocoagulation means production of metal ions electrolytically by using reactive or corroding electrodes composing of electrodes made of elements like Al, Fe or Mg.

Disinfection or sterilization means killing of small living organisms (e.g. bacteria, fungi, germ, pollen, viruses, prions) in waste water.

An electrode is herein an electrically conductive material (metal, semiconductor, graphite, conductive polymer) immersed into the waste water containing electrolytes originating from the source of the waste water or which are intentionally added to achieve an electric current between plus (anode) and minus (cathode) electrodes. The polarity of the anode and cathode may be reversed time to time during the process whilst the terms of anode and cathode are remained for the polarity which the electrodes operate for the majority of time. Term Central rod is used for the electrode locating in the center of the assembly. It is not necessarily rod in form but may have another form like tube, or a rod containing extensions.

Ohmic contact means electrical contacts between electrodes through a conductive material, typically a metal or graphite, whereas an electrolytic contact takes place through positive and negative ions present in the waste water.

Flotation Unit

The flotation part works with known principles of electroflotation. In principle, water decomposition occurs at anode and cathode with molecular oxygen and hydrogen evolution, respectively. However, the real reactions at the electrodes are more complicated since waste waters contain various dissolved ions which make the water electrically conductive and reduce or oxidize themselves. The details of the electrode reactions can be found in textbooks. Flocculation efficiency can be increased by addition of certain known flocculating metal salts or suitable organic polymers known in the prior art. In some cases, proper salts may be added for improving the conductivity or for production of specific toxic gases. The chemistry of production of different gases and other reactive intermediates of electrolysis have been dealt with in detail in textbooks of electrochemistry and elsewhere in the prior art.

The gas formation around the central and inner tubes occurs at the very surface of the electrode. The bubble size is dependent on the properties of the surfaces and electrical current densities. The bubble sizes are small near the surface but when diffused from the surface the bubbles may merge to make assemblies especially with colloids. Since the bubbles are formed electrically, they owe similar electrical charges which tend to prevent the bubbles to merge. It is advantageous to keep the bubble size as small as possible to have the maximum flocculation (colloid braking) and flotation capacity. It is therefore preferable that the fluid flow is constantly mixed to have a maximal contact time with colloids. Mixing will also affect that highly oxidative and acid compounds at anode will not reside for a long time near the electrode and thus mixing can prolong the life of the anode materials. This is also valid as to the basic hydroxyl ions formed at cathode. Optimally the acid and basic compounds are mixed to be neutralized. The mixing can be done, for example, with static mixer blades and reflectors as illustrated in FIG. 1.

Froth Removal

Figure 1:
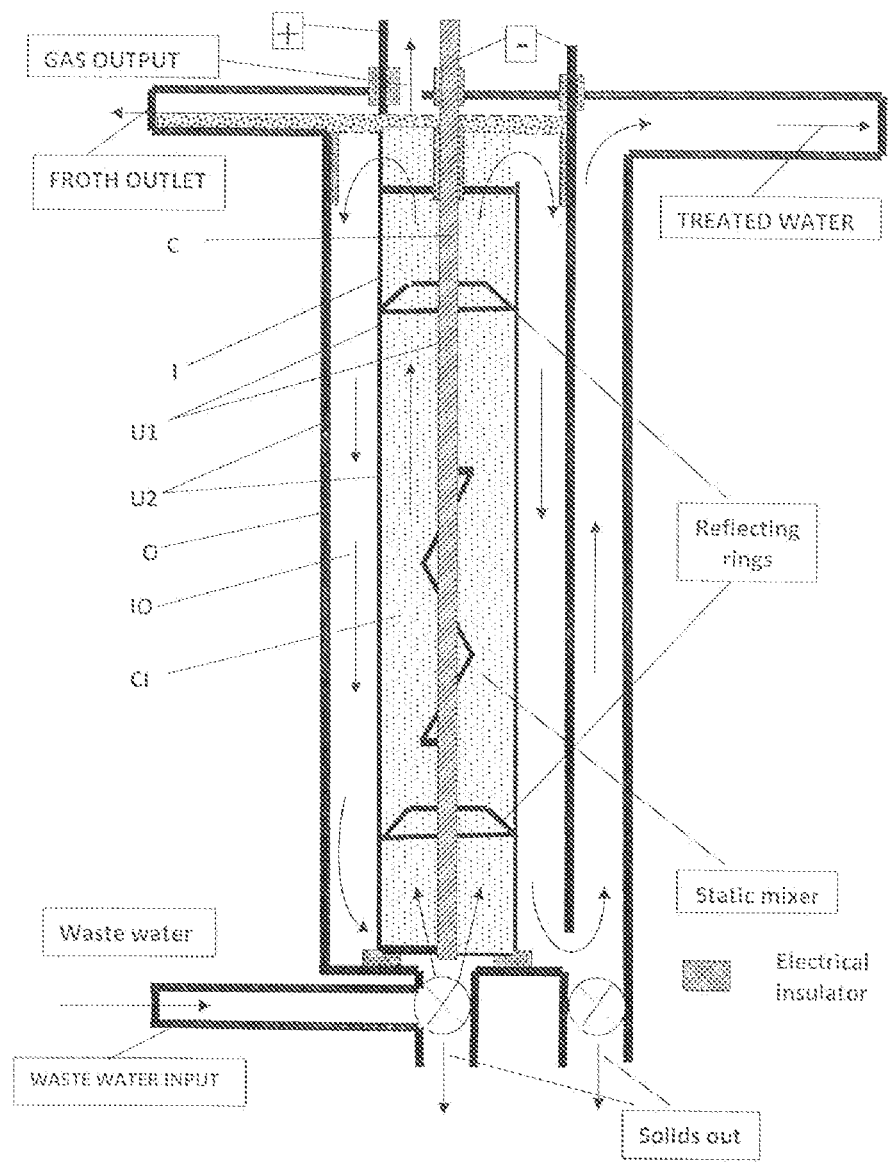
FIG. 1 illustrates the principle of the present invention from the side (longitudinal section). A simplified form of construction contains central rod C, two round metallic tubes, outer tube (O) and inner tube (I). Waste water enters chamber CI between C and I, normally with a constant velocity through the bottom through a valve (round symbol with cross). Electrical current produces gas bubbles at anode and cathode into CI which move upwards with the waste water. The gas bubbles collect various particles and colloids (symbolized by the dots in the Figure) from the waste water and cause reactions to make bigger and stable flocks during the flow up. The flock formation is accelerated by gentle mixing of the up-moving liquid by static mixing blades and reflection rings. The flocks are collected at the upper cover part of (O) and the solids (froth) are moved out actively or passively while gas is collected from the upper part of the cover. The purified water flows into the chamber IO between I and O and moves in opposite (downwards) direction. Electric current between (I) and (O) produces gas which tends to move upwards. The liquid flow downwards and gas flow upwards create a steady state conditions causing highly elevated concentrations of the disinfection gases created by the electrolysis. Clean disinfected (treated) water moves out from a hole in the bottom of (O) and enters the outlet tube overflowing on the level of froth outlet (tube end is indicated by name "treated water"). Wall (I) functions as the anode while (O) and metal rod (C) at the centre of (I) function as the cathodes. The electric potentials of (I) and (C) are opposite and adjustable (U1 and U2) according to the needs. Possible heavy solids can be removed through valves in the bottom (named as solids out).

The flock which are floated to the top of the flotation chamber will be raised into the space reserved for the solids (FIG. 1). Froth can be allowed to move out passively by the evolved gas from holes around the upper cover or cap of the system. The gas itself will flow through a hole in the cap and is introduced to a proper place to be processed further, for example, to be burned after a passing through a liquid gas lock. Hydrogen may be also separated and burned in a fuel cell to produce electricity. Froth removal can be conveniently carried out by applying mechanical scrapers known in the prior art. The solids in the froth originating from sewage waters contain usually significant amounts of alive and killed microbes and viruses and the froth shall therefore be treated in due ways. The waste water, free of flocks overflows passively into the disinfection chamber (FIG. 1, section I-O).

Disinfection

The purpose of the disinfection chamber located between the inner and outer tubes (FIG. 1; I-O) is to disinfect the traces of microbes which may escape from the flotation chamber. The disinfection chamber is designed so that the space between inner and outer tubes is optimal for the overall (average) flow rate through the system. If the flow rate is small compared to average upwards velocity of the gas bubbles generated on the walls of the inner and outer tubes, the system functions partly as a separate flotation chamber, partly as a disinfection chamber. If the fluid velocity of is high, a major part of the bubbles escape from the chamber and go out of the system. It is the aim of the present invention to maintain a steady state balance between gas evolution and forward liquid velocity in the limits that the concentration of the antimicrobial gases and other compounds keep optimal in the disinfection chamber. In this way the electrical current in I-O chamber can be kept in a minimum.

Electrodes

The present invention employs the flotation and disinfection chambers themselves as the electrodes (FIG. 1). The central electrode (C, FIG. 1) can provide also other than electrode functions like as an aid for mixing. The key feature of the present invention is that the inner tube (I, in FIG. 1) functions as the anode from both inside and outside surfaces. It means that this easily changeable single tube is the only corroding part. The construction has been accomplished by an Ohmic separation of the inner tube I, central rod and outer tube. A DC power supply produces two negative potentials as regard of the positive inner tube (I in FIG. 1). The voltages between cathode and anode can be varied in large limits from 5 to 110 V, preferably between 5 V and 26 V. The water decomposition, i.e., electrolysis in the system can be obtained with usual waste waters based on the electrolytic conductivity created by the dissolved ions. Since the voltage between central tube C and outer tube O in respect to inner tube I can be variable, it is advantageous to arrange a resistive coating on the upper part of C and O so that electrical current is kept smooth and corrosion of the upper part of I remains smooth compared to the lower part.

The electrode materials can be chosen in a wide range of Ohmically conducting materials including metals, graphite and organic conductors. Cathode (minus) is not prone to corrosion except those metals which dissolve in basic solutions generated by the injected electrons from cathode. Even easily corrosive materials can be used if the anode is coated with an inert material. Therefore cathode materials can be chosen in a large variety of conductors. Instead, anode (plus) creates strongly acidic oxidative conditions by absorbing electrons during the electrolysis. Practically no metal except gold and platinum are nearly resistant to such conditions. However, because of their high prices, even coating of less precious metals with them is not usually realistic and one must have a compromise between price, current density and life time of the electrode. The most popular electrode materials are austenite steels which contain CrNi, or CrMnNi, or CrNiMo. Titan can be also used to stabilize such steels (CrNiMoTi steels). High Mo content improves strongly the point corrosion stability but is relatively expensive. Titanium (Ti) and its alloys offer excellent corrosion resistance to acids, chlorides and salts and have the highest strength-to-weight ratio of any metal. The most widely used grade of titanium alloy is ASTM Grade 5 (Ti-6Al-4V). Titanium is about 45 percent lighter than steel, 60 percent heavier than aluminum and more than three times stronger than either of them. While initially expensive, Ti lowers life cycle costs because of its long service life and reduced (or non-existent) maintenance and repair costs. Titanium falls into so-called reactive metals, which means that they have a strong affinity for oxygen. At room temperature, titanium reacts with oxygen to form $TiO_2$. This passive, impervious coating resists further interaction with the surrounding atmosphere, and it gives titanium its corrosion resistance. Graphite is resistant but suffers from mechanical fragility. Graphein and other carbon covered electrodes can be also used. In some cases corrosion is intentional, for example, for producing flocculating salts of Al or Fe from the elemental metal electrodes.

Power Supply

Power supply is an essential auxiliary part of the present invention. It is preferable to specify the power supply as regards to the application purpose, conductivity of the liquid, range of the variability of the conductivity, current density, dimensions of the purification system, wanted flow rates of the waste water and so on. It is to be noted that proper protection means against electric shocks are taken care. In a simplest case the power supply has two independent rectified outputs at the secondary output giving suitable DC output voltages for the flotation and disinfection chambers.

The polarities of anode and cathode should be reversible manually or according to a program for cleaning of the electrode surfaces. The periods of reversed polarity may be changed after 5 s to 30 min and they will last from 1 min to several hours depending on the properties of the waste water.

In an advanced model the power supply is adjustable for any voltage in the two chambers and the current is kept automatically constant allowing the voltage floating under set limits. The power supply can be also under control of other parameters like temperature, pressure, conductivity, or turbidity of the liquid in a specified location of the system or be guided by a comparator circuitry. Failures in the power supply may be connected to waste water feed pumps systems. The gas formation is advantageously followed by one or more of sensors which allow bubble parameters to be analysed.

Whole Construction

One of the basic advantages of the present invention is the simplicity of the construction as to manufacturing and services. The preferred construction includes an electrically non-conductive vessel made of materials like plastic, glass- or carbon fibre-reinforced polymer. The invention is not dependent on the relative sizes of the tubes and on the volumes of the liquid chambers. The device is suitable for small purification systems equally well as for several cubic meters systems and up to industrial processes. An advantage of the plastic vessel is that it enables avoiding the outside exhaust tube for the purified and sterilized water. The electrode system can be lifted from the vessel as one unit and the service can be carried out while electrodes can be changed and the plastic vessel does not need to be emptied form liquid. Alternatively, only the (slowly) corroding internal tube (see FIG. 1, I) can be changed simply by taking off the top cover and the tube being replaced. However, if the plastic vessel is not wanted to be made, the outer tube (O) can function as the vessel itself. The voltages on the outer metal surface are not in normal usage (below about 36 V) harmful for humans even in wet places. For prevention of any short circuits, isolating transformer and other protection means should be applied. Electrical ignitions are prevented by proper earth contacts. It is specially notified that the generated gas bubbles on the top of the system are collected and treated, or properly diluted into atmospheric air, without allowing the evolved gases to be collected in larger volumes in a closed place. More detailed instructions for the exhaust gas treatment is to be decided on the place of applying the purification system.

Mechanical or Static Mixers

The fluid to be purified by flotation, or to be sterilized, will move in the fluid channels whereas the gas bubbles are generated on the walls. It is preferable to get the bubbles into a better contact with the microparticles and colloids. Laminar flow can be changed to turbulent by adjusting the electrical current value higher but more advantageously this is done by additional mixing. This can be achieved most simply by static mixers. They can consist of blades of suitable form. The blades can be attached to the central tube or stand independently in the space between the electrodes allowing positive and negative electrode surfaces to be operative. The material of the blades are preferably electrically non-conductive. In the flotation chamber the mixer advantageously creates a circular flow movement on the top of the chamber wherein the froth is collected and thus aids the froth removal. An additional benefit from the mixers is decreased corrosion of the electrodes.

The invention is further illustrated by the following non-limiting example.

Example

FIG. 1 depicts a preferred construction of a pilot device according to the present invention. The central rod, inner and outer tubes were made of standard round stainless steel tubes with diameters of 2, 10 and 20 cm, respectively. The wall thickness of the inner tube (I) was 1 cm while the other walls were 2 mm. The inner tube length was 70 cm and the outer tube 100 cm. The electrical connections to an adjustable (0-36 V) DC power supply of maximum output of 1500 W was connected to the device as shown in FIG. 1. In a pilot system it is necessary to be able to optimize the currents of the flotation and disinfection chambers separately according to the needs depending on the solids load and the level of disinfection. The waste water may contain traces of microbes which are not removed in the previous flotation step and must be disinfected. The disinfection chamber can also eliminate odours through deodorising chemical reactions. The flow rate of a typical household sewage water with solid load of 1-5 g/liter was 1-2 l/min with purification of 97-98%.

Typically, the voltage for a biologically pre-purified sewage water in flotation is 15-24 volts and current 20-50 A. In the disinfection chamber low current densities can be used because of concentration of the disinfection gases. The optima can be found with adjusting liquid flow and applied current.

Variations of the Construction

Whereas circular tube forms of the electrodes are usually optimal for electrical current distribution and for an electrode corrosion, also other forms, like rectangular forms, of the electrodes can be employed. The central tube may also have static mixer blades attached to it. The central tube (electrode) may be also arranged to be rotating and contain then the mixer and/or froth removal blades. In the case of rotating central tube, the blades attached to it can be conductive. The rotating electrode is advantageous for preventing an uneven corrosion. The electrode system may be immersed in a separate electrically insulated bath (named plastic compartment in FIG. 1). The inlets and outlets of the waste water disinfected water may be reversed so that waste water is introduced into the space between inner and outer tubes and is taken off from bottom of central tube, as illustrated in FIG. 2. This construction may be more advantageous for certain organic loads and tube diameters. The overall construction may involve flotation chamber followed by one or more of sterilization chambers as depicted in FIG. 4. Optionally these additional chambers may have electrical potential between them (not shown in FIGS. 3 and 4). The tube system does not necessarily need to be operating in vertical position but may lie in an angle which allows gas bubbles to tend to move towards the wall situating upper than the opposite wall. This causes a natural liquid mixing stream and also may improve the removal of froth.

The invention claimed is:

1. A purification and disinfection device to purify waste water by a two-step procedure, said device having an electroflotation unit, and an electrical disinfection unit integrated into same construction, wherein:
   i) the device contains at least three ohmically isolated electrically conductive tubes, said tubes being a central rod (C), an inner tube (I) and an outer tube (O) organized concentrically so that a space containing the central rod (C) inside the inner tube (I) forms the electroflotation unit and a space between the inner tube (I) and the outer tube (O) forms the disinfection unit;
   ii) lower ends of the tubes are sealed but contain entrance of waste water into the electroflotation unit;
   iii) lower end of the outer tube (O) contains opening for outlet of purified and disinfected waste water;
   iv) upper ends of the tubes contain outlets for electrolysis gases and froth and overflow of water from the electroflotation unit to the disinfection unit in which flow of water goes from up to down to effect concentrating electrolytically achieved disinfecting gases;
   v) the outer tube (O), the central rod (C), and the inner tube (I) function as electrodes for effecting electroflotation and electrical disinfection of waste water;
   vi) the inner tube (I) functions as an anode, and the central rod (C) and the outer tube (O) function as cathodes which are not, however, necessarily in the same electrical potential in the respect to inner tube (I);
   vii) the electrodes formed of the inner tube (I) and central rod (C), and the electrodes formed of the inner tube (I) and the outer tube (O) are pair-wisely electrically connected to an adjustable DC power supply, or pair-wisely connected to two separately adjustable DC power supplies; and
   viii) the construction and materials of the device allow temporary changing of polarity without invalidating of normal function of the device.

2. The purification and disinfection device of claim 1 wherein the anode formed of the inner tube (I) is made of iron, steel, stainless steel titanium, copper, graphite, or their anticorrosion-coated forms, and the cathodes formed of the outer tube (O) and the central rod (C) are either made of same materials as the anode or of less corrosion-resistant materials.

3. The purification and disinfection device of claim 1, wherein the central rod (C) is in a form of a bar, a tube, or a rod with extensions.

4. The purification and disinfection device of claim 1, wherein direct current over two cathodes and one anode are independently adjustable within limits of 5-110 volts.

5. The purification and disinfection device of claim 1, wherein cross-sectional shapes of the inner tube (I) and the outer tube (O) are not circular.

6. The purification and disinfection device according to claim 1, wherein the electroflotation or the disinfection unit, or both units, contain one or more static mixers or reflecting rings or both to increase turbulent flow.

7. The purification and disinfection device of claim 1 wherein polarity between anode and cathode can be changed independently in the electroflotation and disinfection units to achieve un-fouling of electrode surfaces.

8. The device according to claim 1 having one or more additional concentric tubes around the outer tube (O) through which one or more additional concentric tubes waste water is forced to flow and which one or more additional concentric tubes are connected to a DC power supply so that there is a voltage difference between a pair of each tubes.

9. A purification and disinfection device to purify waste water by a two-step procedure, said device having an electroflotation unit, and an electrical disinfection unit integrated into same construction, wherein:
   i) the device contains at least three ohmically isolated electrically conductive tubes, said tubes being a central rod (C), an inner tube (I) and an outer tube (O) organized concentrically so that a space containing the central rod (C) inside the inner tube (I) forms the disinfection unit and a space between the inner tube (I) and the outer tube (O) forms the electroflotation unit;
   ii) lower ends of the tubes are sealed but contain entrance of waste water into the electofloation unit;
   iii) lower end of the disinfection unit contains opening for outlet of purified and disinfected waste water;
   iv) upper ends of the tubes contain outlets for electrolysis gases and froth and overflow of water from the electroflotation unit to the disinfection unit in which flow of water goes from up to down to effect concentrating electrolytically achieved disinfecting gases;
   v) the outer tube (O), the central rod (C), and the inner tube (I) function as electrodes for effecting electroflotation and electrical disinfection of waste water;

vi) the inner tube (I) functions as an anode, and the central rod (C) and the outer tube (O) function as cathodes which are not, however, necessarily in the same electrical potential in the respect to inner tube (I);

vii) the electrodes formed of the inner tube (I) and central rod (C), and the electrodes formed of the inner tube (I) and the outer tube (O) are pair-wisely electrically connected to an adjustable DC power supply, or pair-wisely connected to two separately adjustable DC power supplies; and viii) the construction and materials of the device allow temporary changing of polarity without invalidating of normal function of the device.

10. The purification and disinfection device of claim 9, wherein the anode formed of the inner tube (I) is made of iron, steel, stainless steel titanium, copper, graphite, or their anticorrosion-coated forms, and the cathodes formed of the outer tube (O) and the central rod (C) are either made of same materials as the anode or of less corrosion-resistant materials.

11. The purification and disinfection device of claim 9, wherein the central rod (C) is in a form of a bar, a tube, or a rod with extensions.

12. The purification and disinfection device of claim 9, wherein direct current over two cathodes and one anode are independently adjustable within limits of 5-110 volts.

13. The purification and disinfection device of claim 9, wherein cross-sectional shapes of the inner tube (I) and the outer tube (O) are not circular.

14. The purification and disinfection device according to claim 9, wherein the electroflotation or the disinfection unit, or both units, contain one or more-static mixers or reflecting rings or both to increase turbulent flow.

15. The purification and disinfection device of claim 9 wherein polarity between anode and cathode can be changed independently in the electroflotation and disinfection units to achieve un-fouling of electrode surfaces.

16. The device according to claim 9 having one or more additional concentric tubes around the outer tube (O) through which one or more additional concentric tubes waste water is forced to flow and which one or more additional concentric tubes are connected to a DC power supply so that there is a voltage difference between a pair of each tubes.

* * * * *